March 4, 1924.
W. F. FOLMER
AVIATOR'S CAMERA
Filed Nov. 16, 1921    2 Sheets-Sheet 1
1,485,603
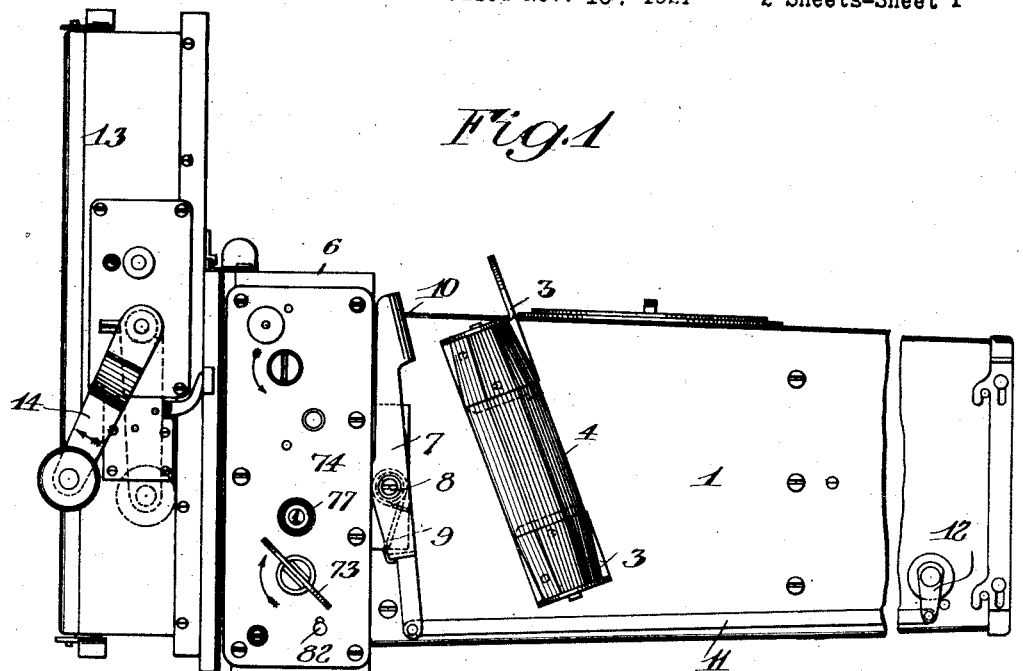

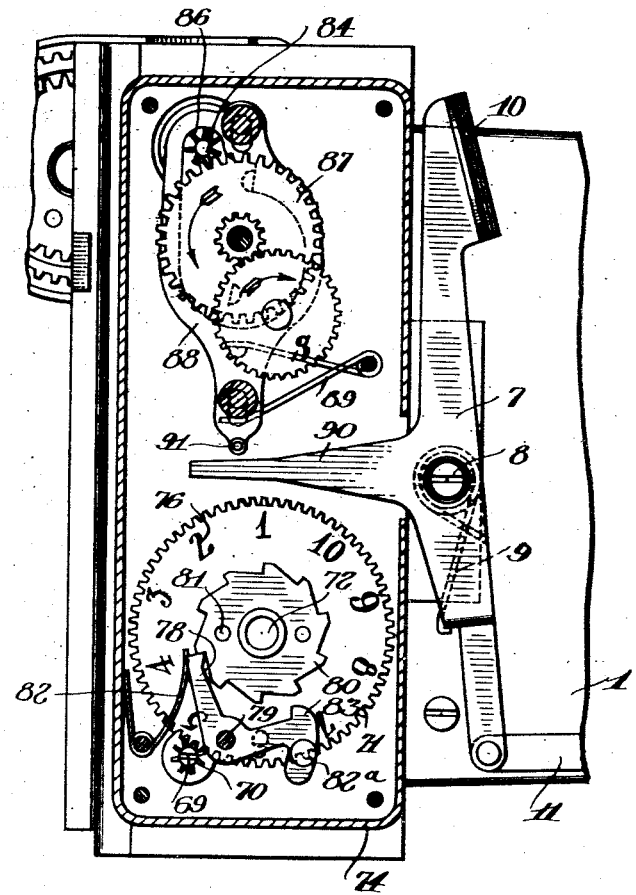

Patented Mar. 4, 1924.

1,485,603

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

AVIATOR'S CAMERA.

Original application filed March 3, 1919, Serial No. 280,258. Divided and this application filed November 16, 1921. Serial No. 515,644.

*To all whom it may concern:*

Be it known that I, WILLIAM F. FOLMER, of Rochester, in the county of Monroe and State of New York, have invented certain new and useful Improvements in Aviators' Cameras; and I do hereby declare the following to be a full, clear, and exact description of the same, reference being had to the accompanying drawing, forming a part of this specification, and to the reference numerals marked thereon.

My present invention relates to photography, and more particularly, to photographic cameras, and it has for its object to provide a strong and serviceable camera particularly adapted for aerial photography. This application is a division of my prior original application Serial No. 280,258, filed Mar. 3, 1919, which has resulted in Patent No. 1,400,277, dated December 13, 1921, and the improvements herein contained relate to the provision of novel means for supporting the camera or, more particularly, to the provision of convenient and efficient handles whereby the operator may properly support the camera with freedom and to the best advantage, and at the same time maintain perfect control over the exposing mechanism. To these and other ends the invention consists in certain improvements and combinations of parts, all as will be hereinafter more fully described, the novel features being pointed out in the claims at the end of the specification.

In the drawings:

Figure 1 is a side view partly broken away of a photographic camera constructed in accordance with and illustrating one embodiment of my invention;

Figure 2 is a top view similarly broken away, and

Figure 3 is an enlarged fragmentary section through a casing that houses parts of the shutter mechanism.

Similar reference numerals throughout the several views indicate the same parts.

In the embodiment shown, the camera comprises an elongated body 1 for a long focus lens (not shown) located at the front thereof that casts the image in a focal plane in the rear of an exposure opening at the back of the camera body. Brackets 3 secured to opposite sides of the body carry hand grips 4 preferably arranged in a rearwardly inclined position, as shown, and located approximately at the point of balance. The operator grasps the grips with his two hands and holds the camera at a partial arm's length in front of him and slightly above his line of vision, which latter is taken through a particular form of finder or sighting device 5. The inclination of the grips 4 makes this position a natural and convenient one for the hands. The camera is fitted with a roller blind or curtain shutter housed within an enlargement 6 at the rear end of the body 1, which shutter is tripped to make an exposure by an operating lever 7 pivoted at 8 and held in the normal position of Figure 1 by a spring 9. The lever is so arranged adjacent to the handle 4 that an offset 10 at its upper end can be conveniently engaged by the thumb of the operator and moved by a squeezing pressure of the hand in which the fingers that are meantime supporting the camera, react against the grip 4 and prevent a jerky action that might otherwise destroy the aim. A link 11 is shown to connect the operating lever 7 with a crank 12 at the front of the camera. This crank actuates another flap shutter (not shown) that normally protects the lens, but this subject matter has nothing to do with the present invention.

A detachable magazine 13 at the rear of the camera body constitutes the holder for the sensitized material which, in the present instance, consists of plates that are shifted from a storage chamber to a lower exposure chamber by means of a crank 14 on the exterior of the magazine. After an exposure has been made, a throw of this crank feeds a fresh plate into position for exposure and also winds the curtain shutter. A device is provided which prevents the crank from being operated when the magazine or holder 13 is removed from the camera body. Provision is also made for automatically locking the shutter mechanism to again receive the gearing of the crank when the magazine is removed, and the same devices under the control of the shutter mechanism, prevent the magazine from being removed until the crank 14 is in such position as to prevent the fogging of the foremost plate, all as is described in detail in my said original application.

To give a brief idea of how the operating lever 7 controls the roller blind shutter, the latter is, per se, of the usual type embodying a curtain, an upper feed roll therefor and a spring actuated tension roll at the bottom of the camera body, none of these parts being shown herein because their action is well known in the art. The shaft 69 of the winding roll terminates in a pinion 70 (Figure 3) that meshes with a gear 71 turning on a stud 72. The latter is turned by a winding key 73 on the exterior of a casing 74 that encloses the mechanism being described and when so turned in the direction of the arrow in Figure 1, the gear winds the spring 75 of the winding roller and increases the tension for more rapid exposures. As such winding progresses, characters 76 on the gear 71 are successively exposed through an opening 77 in the casing 74 to indicate the tension. Retrograde movement is prevented by an escapement pawl 78 pivoted at 79 to the casing engaging a ratchet 80 pinned to the gear 71 at 81 and the pawl is held in such engagement by a spring 82. To reduce the spring tension and reverse the function of the winding key 73, the escapement pawl 78 is vibrated by means of a finger piece 82ª on the exterior of the casing, whereupon another engaging tooth 83 of the pawl alternates with the first and permits intermittent retrograde motion in the usual manner.

The feed roll 67 turns on journals, one of which is shown at 84 (Figure 3) terminating in a pinion 86 meshing with a stop gear 87 in the casing 74. The revolutions of the stop gear are controlled by a reciprocatory escapement member 88 in a well known manner, the details of which are not essential to an understanding of the present invention. It is sufficient to say that the member 88 is normally held in its lowermost position by a spring 89 and when raised, it causes the curtain to be run off onto the tension roll sufficiently to carry the exposure aperture past the exposure opening and also causes the curtain to be then halted through a locking of the pinion 86 with the feed roll which locking is maintained as the member 88 is lowered again by its spring. This actuation of the member 88 is brought about by the operating lever 7 previously described and which has an arm 90 passing rearwardly through the casing 74 to engage a roller 91 on the member 88.

I claim as my invention:

1. In a camera, the combination with a body provided with a sighting device adapted to be viewed from the rear of the camera and having rigid hand grips located on opposite sides of the body at the center of balance, of a shutter, and a shutter operating member located adjacent to one of the handles to be operated by the hand that supports the camera through the medium of the handle.

2. In a camera, the combination with a body provided with a sighting device adapted to be viewed from the rear of the camera and having rigid rearwardly inclined hand grips upon opposite sides of the body at the center of balance, of a shutter, and a shutter operating lever located in rear of one of the grips and having an offset portion adapted to be engaged by the operator's thumb while his fingers react against the grip and support the camera.

WILLIAM F. FOLMER.